United States Patent [19]

Stephens

[11] 4,335,698
[45] Jun. 22, 1982

[54] VAPORIZATION CHAMBER

[75] Inventor: Christopher M. Stephens, Tulsa, Okla.

[73] Assignee: Max-Mi Corporation, Tulsa, Okla.

[21] Appl. No.: 93,296

[22] Filed: Nov. 13, 1979

[51] Int. Cl.³ .......................................... F02M 27/00
[52] U.S. Cl. ...................................... 123/537; 239/4; 239/533.13; 123/590
[58] Field of Search ............... 123/536, 537, 590, 523, 123/524, 52 M, 198 E; 261/81, DIG. 48; 239/4, 102, 381, 561, 602, 229, 533.2, 533.13

[56] References Cited

U.S. PATENT DOCUMENTS

| | | | |
|---|---|---|---|
| 1,790,854 | 2/1931 | Defrance et al. | 123/590 |
| 1,939,302 | 12/1933 | Heaney | 123/198 E |
| 2,978,870 | 4/1961 | Vdoviak | 239/533.2 |
| 3,826,235 | 7/1974 | Pasbrig | 123/590 |
| 3,942,499 | 3/1976 | Kunik et al. | 123/548 |
| 3,998,195 | 12/1976 | Scott | 123/52 M |
| 4,038,348 | 7/1977 | Kompanek | 261/DIG. 48 |
| 4,123,481 | 10/1978 | Herold et al. | 261/DIG. 48 |
| 4,173,206 | 11/1979 | Masaki | 123/538 |
| 4,237,836 | 11/1980 | Tanasawa et al. | 123/537 |

FOREIGN PATENT DOCUMENTS

| | | | |
|---|---|---|---|
| 2542718 | 4/1977 | Fed. Rep. of Germany | 261/DIG. 48 |
| 28562 | of 1907 | United Kingdom | 123/52 M |
| 2023724 | 1/1980 | United Kingdom | 239/102 |

Primary Examiner—Craig R. Feinberg
Attorney, Agent, or Firm—Head & Johnson

[57] ABSTRACT

A vaporization chamber for an internal combustion engine, the engine having a liquid fuel reservoir and an intake manifold, the generator serving to convert liquid fuel to a combustible gas mixture including a vaporization chamber the outlet of which is connected to the engine intake manifold, a plurality of small diameter tubular reeds extending within the vaporization chamber and communicating with the inlet and means of introducing liquid fuel from the fuel reservoir and air through the reeds into the vaporization chamber.

9 Claims, 4 Drawing Figures

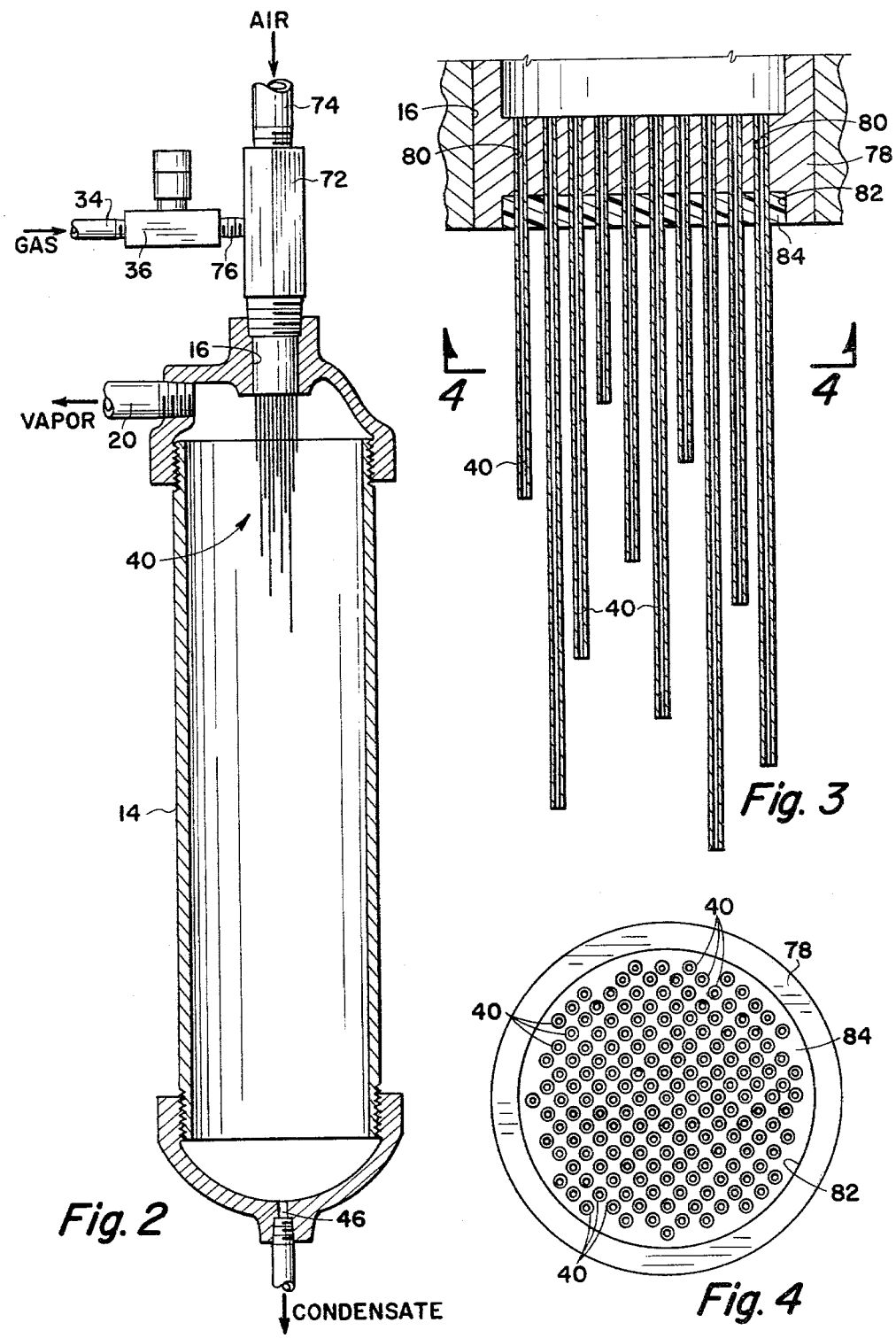

VAPORIZATION CHAMBER

BACKGROUND OF THE INVENTION

1. Field of the Invention

This invention relates to apparatus for transforming a liquid fuel such as gasoline, into a gas or vapor for internal combustion engines.

In present use throughout the world, automobiles, buses, trucks, and so forth typically employ carburetors which serve the purpose of transforming liquid fuel, particularly gasoline, into a gaseous vapor which is exploded in the internal combustion engine. Liquid hydrocarbon fuel such as gasoline, must be converted into vapor to provide the explosive force which provides the energy of internal combustion engines. In diesel type engines where fuel is injected, the fuel is vaporized as it enters the cylinder, and the heat of the cylinder aids in vaporization. In a carburetor, the liquid fuel is simply injected into the moving air stream to achieve vaporization.

While carburetors work satisfactory, they do not achieve complete vaporization of liquid fuel under all conditions and for this reason, the efficiency of internal combustion engines is never equal to the optimum maximum energy recovery of the liquid fuel. The present invention is directed towards a method of transforming a liquid fuel, and particularly gasoline, into a gaseous fuel for more complete combustion in the cylinders of internal combustion engines.

2. Description of the Prior Art

As above stated, the typical internal combustion engine for use in vehicles today employs carburetors for mixing liquid gasoline with air to produce the explosive gas or vapor which is utilized in the engine cylinders. Others have suggested vaporization chambers for transforming liquid into gas, but such have not been found to be universally acceptable and the vast majority of engines today employ carburetors.

The present invention is directed towards improved means of converting liquid fuel to vapor for use in internal combustion engines and particularly, to a unique arrangement for insuring more complete vaporization of the liquid fuel and thereby greater efficiency of use of the fuel.

SUMMARY OF THE INVENTION

A generator for converting liquid fuel to combustible gas for an internal combustion engine having a liquid fuel reservoir including a vaporization chamber having an outlet and an inlet, the outlet being connected to the engine intake manifold, a plurality of small diameter tubular reeds extending within the vaporization chamber and communicating with the inlet, and means of introducing liquid fuel from the reservoir and air through the reeds into the vaporization chamber where the liquid fuel is vaporized to produce the combustible gas mixture as it combines with the air and fuel passing through the reeds, the vaporized combustible gas passing out from the vaporization chamber outlet to the engine intake manifold where it is consumed by the engine.

DESCRIPTION OF THE DRAWINGS

FIG. 2 is an elevational view shown partially in cross-section of an embodiment of the generator.

FIG. 3 is an enlarged partial cross-sectional view of the intake portion of the generator showing the manner in which the tubular reeds are supported in the intake.

FIG. 4 is a cross-sectional view taken along the line 4—4 of FIG. 3 showing the reeds as employed in the generator.

DETAILED DESCRIPTION

Figure 1:
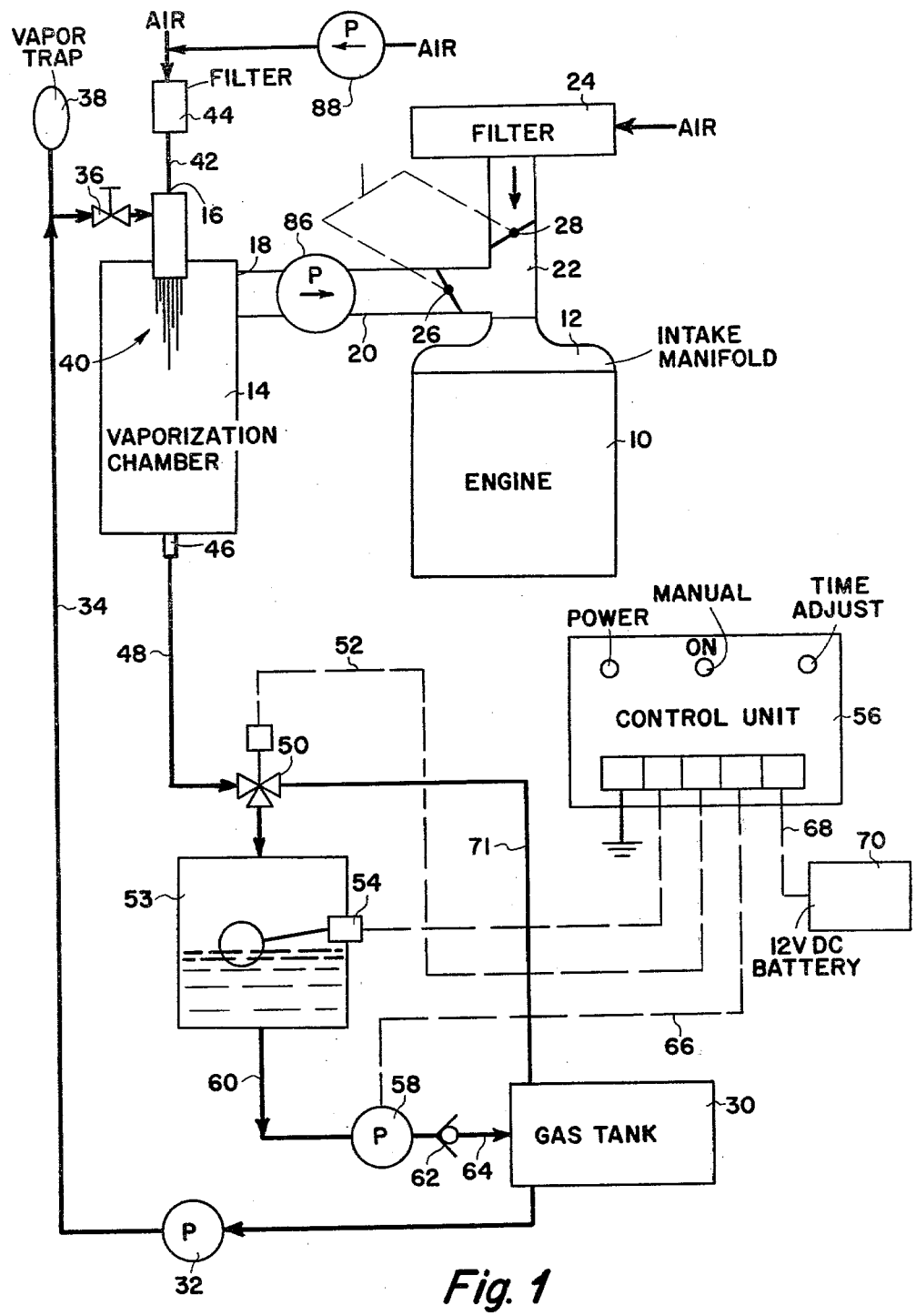
FIG. 1 is a schematic drawing of the manner in which the generator of this invention is employed with an internal combustion engine, including control devices.

Referring to the drawings and first to FIG. 1, an internal combustion engine is indicated generally by the numeral 10. The engine includes an intake manifold 12 by which vaporous fuel is drawn into the engine and distributed to each of the cylinders. In the typical internal combustion engine, a carburetor fits on top of the intake manifold and has a fuel line connected to it. The carburetor serves to atomize the liquid fuel and convert it into a vapor which is distributed by the intake manifold. In the present engine the use of a carburetor is not employed and instead, the liquid fuel is transformed into a combustible gas or vapor in a vaporization chamber 14.

The vaporization chamber 14 has an inlet generally indicated by the numeral 16 in which liquid fuel and air are drawn into the interior of the chamber. Adjacent the top of the vaporization chamber is an outlet 18 which communicates by a conduit 20 to an air-gas mixer 22. Affixed to the upper end of the air-gas mixer 22 is an air filter 24 which functions in the same manner as the air filter typically communicating with the upper air inlet of a carburetor. The outlet of the air-gas mixer 22 communicates with the engine intake manifold 12. To control the ratio of fuel gas passing through conduit 20 into the air-gas mixer, a butterfly valve 26 is employed. In like manner, to control the air passing from filter 24 into the air-gas mixer, a butterfly valve 28 is employed. In order to provide for variable fuel consumption which produces variable energy from the engine 10, the valves 26 and 28 are preferably inter-linked so that they open and close simultaneously. In this manner the ratio of fuel gas to air is properly maintained for maximum fuel efficiency.

The engine 10 is accompanied by a fuel reservoir 30. A fuel pump 32 pumps liquid fuel, such as gasoline, from the reservoir 30 by way of fuel line 34 through a needle valve 36 into the vaporization chamber inlet 16. A vapor trap 38 may be employed in connection with line 34, as illustrated.

Positioned in the vaporization chamber inlet 16 are a plurality of small diameter tubular reeds 40 through which the liquid fuel and air pass. To permit air passage into the vaporization chamber through the reeds, a conduit 42 is open to the atmosphere through a filter 44. The arrangement of the tubular reeds 40 and their function is an important part of the invention, and this structure will be described in greater detail subsequently.

The vaporization chamber 14 includes a condensation outlet 46 in the bottom connected to a condensation line 48. Line 48 connects to an electrically operated valve 50. In the normal condition, valve 50 is closed. When voltage is applied by conductor 52, the valve is opened, and any condensation collected in the bottom portion of vaporization chamber 14 flows into a liquid collection vessel 53. Within vessel 53 is a liquid level detector illustrated as a float switch 54 which is closed when the level of fluid in the collector 53 reaches a preselected level. Upon closure of float switch 54 a signal is applied to a control unit 56. Circuitry (not shown) within the control unit functions to apply electrical energy to a fuel pump 58 connected by tubing 60 to the lower portion of the collection vessel 53. The output of pump 58 connects through a check valve 62 and tubing 64 to the fuel reservoir 30. The conductor from control unit 56 to supply electrical energy to fuel pump 58 is identified by the number 66. Power to control unit 56 is supplied by conductor 68 from battery 70.

Control unit 56 functions to periodically open valve 50 for short durations sufficient to keep condensed fuel from accumulating to an undesirable level in vaporization chamber 14. A pressure equalizing line 71 is connected from valve 50 to gas tank 30.

When fuel collects in the collection vessel 53 to a level actuating valve 54, the control unit supplies electrical power to fuel pump 58 for a preselected length of time to empty the collection vessel and return the fuel back to reservoir 30.

Referring to FIG. 2, the vaporization chamber 14 is shown in greater detail. The chamber is in the form of a vertical vessel having an upper inlet 16. Connected to the inlet is an inlet fitting 72 which receives, at the upper end thereof, a conduit 74 by which air is admitted. In addition, the inlet fitting 72 has a side outlet connected by a short conduit 76 to the needle valve 36 by which fuel is admitted into the inlet fitting 72.

The inlet of the vaporization chamber 14 receives the plurality of tubular reeds 40 and the manner in which this is achieved is best illustrated in FIGS. 3 and 4. Positioned within the inlet 16 is a cylindrical block 78 having a small diameter hole 80 therethrough for each tubular reed. The reeds 40 are fitted in openings 80, such as by press fit or they may be retained such as by soldering or welding. The reeds 40 completely close the openings 80 so that all passage of fuel and air through the opening 16 is by way of reeds 40.

In FIG. 3 the preferred arrangement for supporting the reeds is illustrated. Block 78 includes a recess 82 in the lower end thereof through which all reeds 40 pass. Positioned within the recess 82 surrounding the reeds is a hard epoxy layer 84. The epoxy layer 84 serves to ensure the secure retention of the reeds in openings 80 and in addition, provides improved vibrational characteristics to the reeds.

Each of the reeds 40 is an elongated tubular thin wall member. The reeds are preferably from about 0.0010 inch to 0.0076 inch inside diameter. The length of the reeds vary from about 1¾" to 5". The number of reeds employed depends upon the maximum fuel vapor required of the engine (which in turn is related to the cubic inch displacement of the engine) with which the device is used. In the preferred arrangement the reeds are of variable length and may consist of only three or four reeds or a large number of reeds, such as illustrated in FIGS. 3 and 4. The reeds are spaced apart so as not to touch each other.

The outside diameter of the reeds is dependent on the ID. Thin wall metal tubing is preferred, and the tubing used for manufacturing hypodermic needles is ideal for making the reeds.

As liquid fuel and air travel through the reeds, drawn into the generator by the vacuum supplied from the engine intake manifold, a harmonic condition is created which causes the reeds to vibrate, to thereby greatly enhance the vaporization of fuel within chamber 14. Needle valve 36 may be employed to adjust the fuel-to-air ratio passing through the reeds to obtain maximum vaporization within the chamber 14. If additional vacuum is required within the chamber, a vacuum pump (not shown) may be employed.

The vapor from chamber 14 is withdrawn through conduit 20 and, as illustrated in FIG. 1, passes through the air-gas mixer 22 to the intake of the engine. Thus te vaporization generator of the invention provides the function of a carburetor in that it converts liquid fuel to a gaseous or vaporous fuel. This gaseous fuel is mixed with the proper amount of air in the air-gas mixer 22 and directed into the intake manifold of the engine. The more thorough vaporization which is achieved by the vaporization chamber means that when the fuel-air mixture is consumed in the engine a greater efficiency of fuel usage is achieved by the engine. This is true since substantially 100% combustion of the fuel is obtained by superior vaporization. The amount of unburned hydrocarbon passing out of the cylinders of the engine is reduced. In this manner the fuel efficiency of an engine is enhanced when the vaporization chamber and the auxiliary equipment illustrated in FIG. 1 are employed for internal combustion engines, compared with engines operating only by use of the standard type of carburetors in current usage today.

A preferred embodiment of the invention has been illustrated and described, but obviously many changes may be made in the structures for practicing the invention. The vaporization chamber 14 need not be cylindrical nor be upright, but may be of virtually any shape. The tubular reeds do not have to be vertical.

The arrangement for handling liquid fuel from vaporization chamber 14 may be altered. For instance, line 48 may connect directly to the input of pump 58. In this arrangement pump 58 may operate continuously to keep fluid pumped from the vaporization chamber 14 back to fuel tank 30, or the pump may be operated cyclicly, such as 10 seconds on and 5 minutes off, or any other timing sequence desired.

In order to insure sufficient vacuum in vaporization chamber 14, a vacuum pump 86 may be interposed in conduit 20. Pump 86 provides positive vacuum to ensure vaporization of fuel in chamber 14 even when the vacuum from intake manifold 12 is low, such as during acceleration of the vehicle using the system. Pump 86 is preferably electrically operated from battery 70 (no conductor being shown) and may include a switching arrangement (also not shown) so that it is automatically turned on when the vehicle ignition is turned on, or it may include a vacuum actuated switch (not shown) which turns on pump 86 automatically when the pressure in vaporization chamber 14 rises above a given sub-atmosphere level.

Another means of ensuring the flow of air and liquid fuel through reeds 40 is to employ an air pump or air compressor 88 connected to the inlet 16 of the vaporization chamber. Air from compressor 80 may be directed through filter 44 and conduit 42 to the inlet 18 of the vaporization chamber, as shown in FIG. 1, or the outlet of compressor 88 may be connected directly to conduit 74 of FIG. 2. Both compressor 88 and vacuum pump 86 may be employed simultaneously, although normally both are not required, and in some applications, neither are required.

What is claimed is:

1. For an internal combustion engine having a liquid fuel reservoir and an intake manifold, a generator for converting liquid fuel to a combustible gas, comprising:

a vaporization chamber having an outlet and an inlet, the outlet being connected to the engine intake manifold;

a plurality of small diameter spaced apart independently vibratable tubular reeds extending within said vaporization chamber and communicating with said inlet; and means of introducing liquid fuel from the reservoir and air through a passage located within each of said reeds into said vaporization chamber, the reeds being dimensioned so that they vibrate harmonically by the effect of fuel and air passing therethrough.

2. A combustion gas generator according to claim 1 including:

means of simultaneous variably controlling the quantity of combustible gas from said generator and the quantity of air passing into the engine intake manifold.

3. A combustion gas generator according to claim 1 wherein the reeds are from about 1.75 to about 5 inches in length.

4. A combustion gas generator according to claim 1 wherein the length of said reeds are of variable length between 1.75 and 5 inches.

5. A combustion gas generator according to claim 1 wherein said reeds are of metal, are thin walled, are of length between about 1.75 and 5 inches and inside diameter of about 0.001 to about 0.0076 inches.

6. A combustion gas generator according to claim 1, said inlet in said vaporization chamber comprises:

an opening in said vaporization chamber;

a metal plug received in and closing said opening, the plug having an opening therethrough for each said reed, and one each of said reeds being received in a said opening; and a layer of hard epoxy received on the interior surface of said plug and surrounding each of said reeds extending therefrom.

7. A combustible gas generator according to claim 1 including:

means for evacuating liquid from said vaporization chamber.

8. A combustible gas generator according to claim 7 wherein said means for evacuating liquid from said vaporization chamber comprises:

a liquid collection vessel having an inlet and outlet;

a conduit connecting the collection vessel inlet to a lower portion of said vaporization chamber; and means of conducting liquid fuel out of said collection vessel to the liquid fuel reservoir.

9. A combustion gas generator according to claim 8 including:

a liquid level detector means in said collection vessel;

an electrically controlled solenoid valve in said conduit between said vaporization chamber and said collection vessel;

and means of opening said control valve when the liquid in said collection vessel reaches a preselected level.

* * * * *